(No Model.) 7 Sheets—Sheet 1.

T. H. WARD.
APPARATUS FOR INDICATING WEIGHTS AND TESTING STRENGTH OF METALS.

No. 304,587. Patented Sept. 2, 1884.

Witnesses:—
John M. Clayton
James F. Tobin

Inventor
Thomas H. Ward
by his Attys
Howson and Son (No Model.) 7 Sheets—Sheet 2.
T. H. WARD.
APPARATUS FOR INDICATING WEIGHTS AND TESTING STRENGTH OF METALS.
No. 304,587. Patented Sept. 2, 1884.
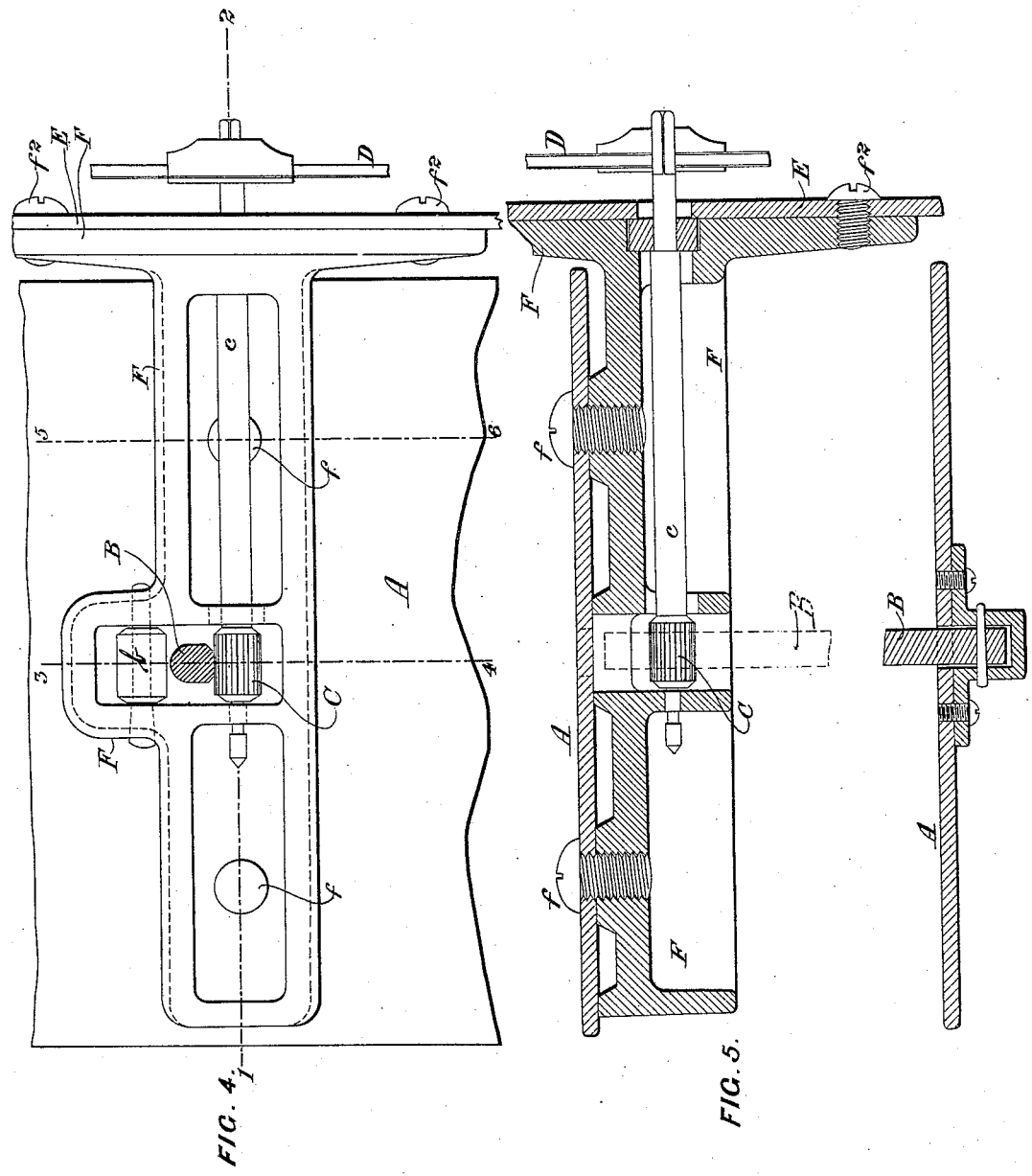

(No Model.) 7 Sheets—Sheet 3.
T. H. WARD.
APPARATUS FOR INDICATING WEIGHTS AND TESTING STRENGTH OF METALS.
No. 304,587. Patented Sept. 2, 1884.
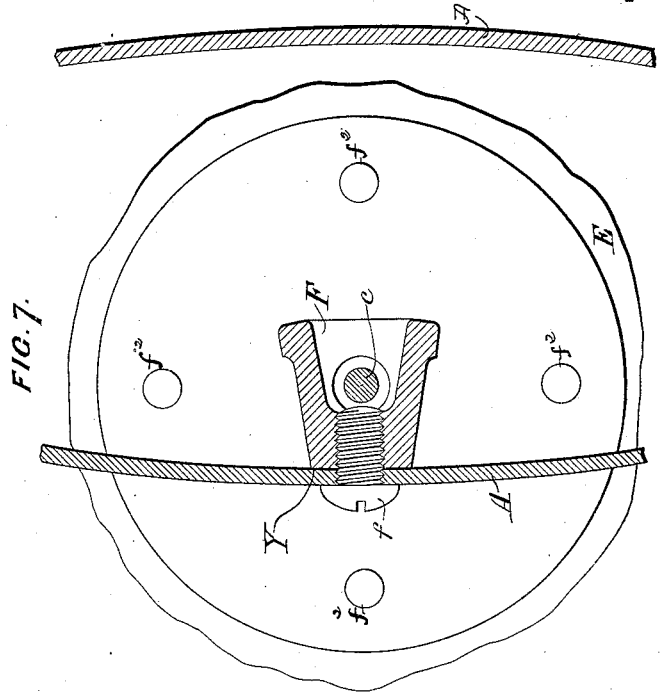
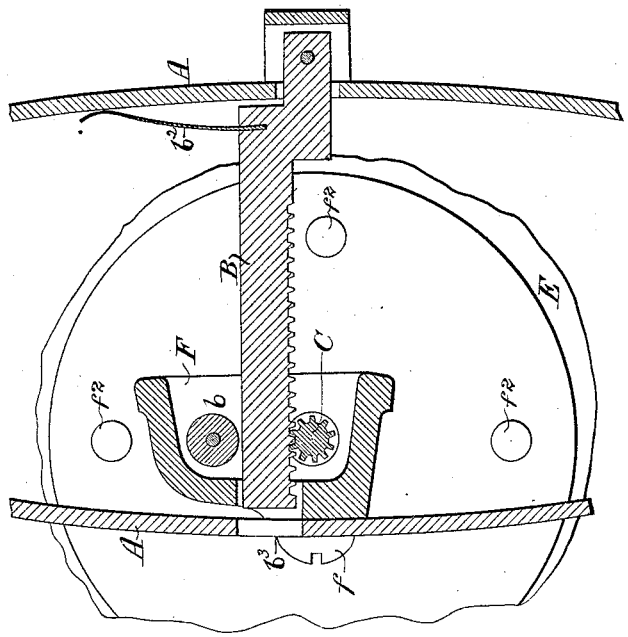
Witnesses:—
John M. Clayton
James F. Tobin
Inventor
Thomas H. Ward
by his Attys
Howson and Sons

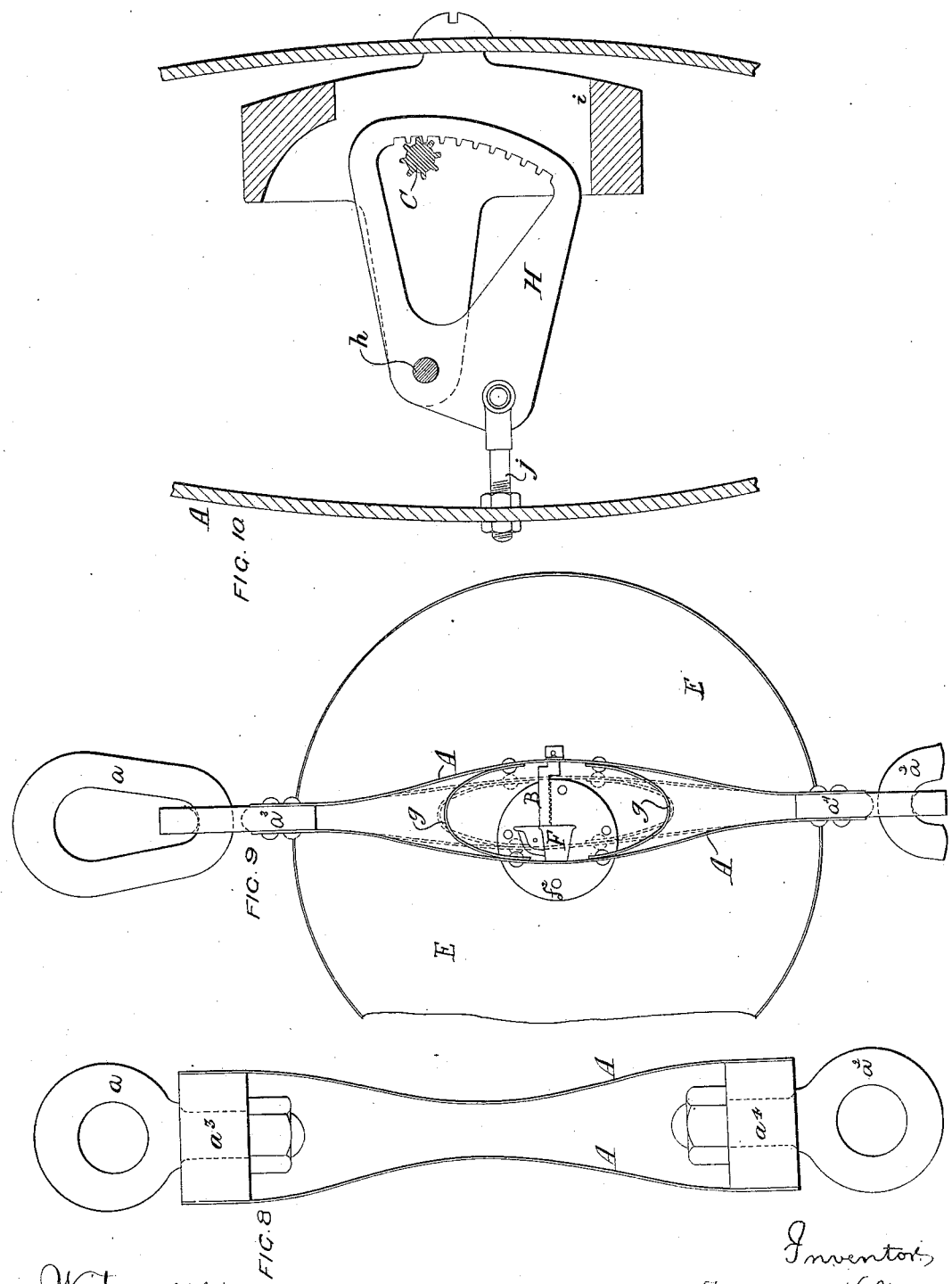

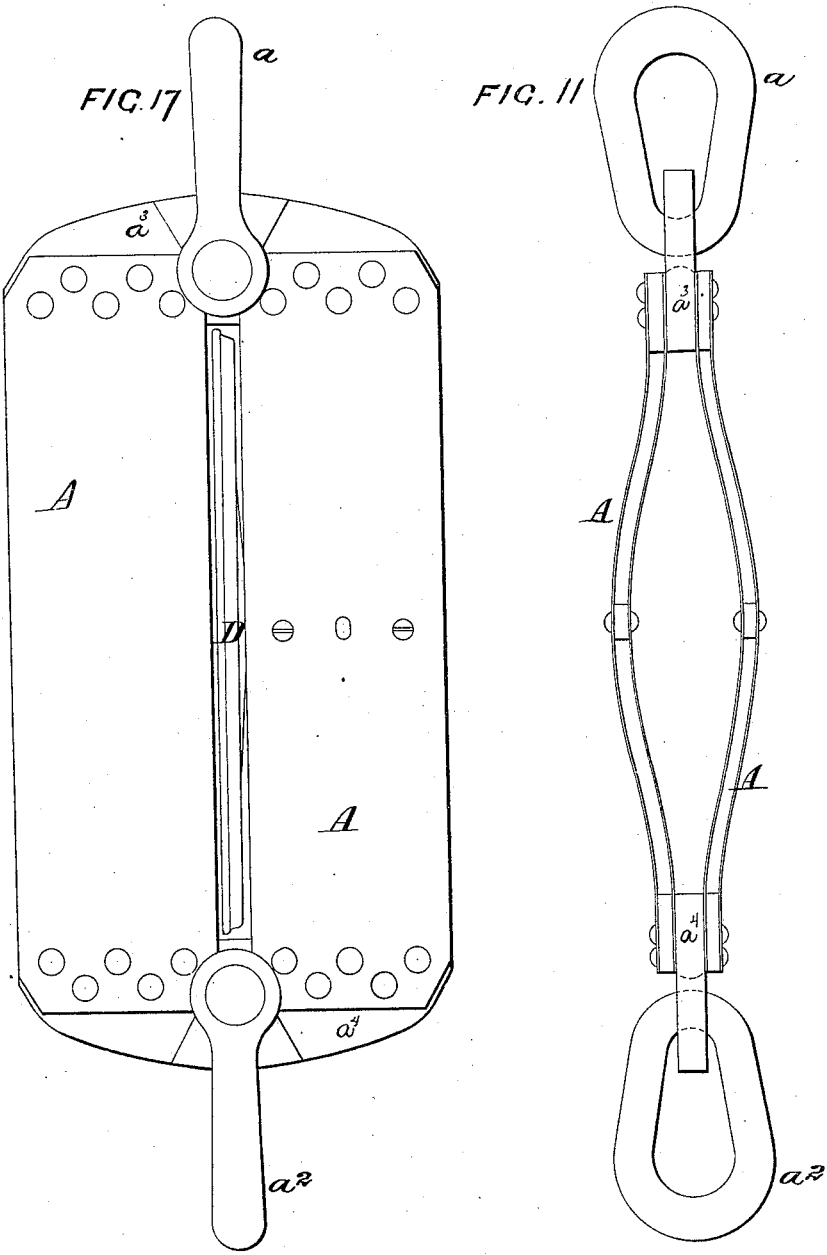

(No Model.) 7 Sheets—Sheet 6.
T. H. WARD.
APPARATUS FOR INDICATING WEIGHTS AND TESTING STRENGTH OF METALS.
No. 304,587. Patented Sept. 2, 1884.
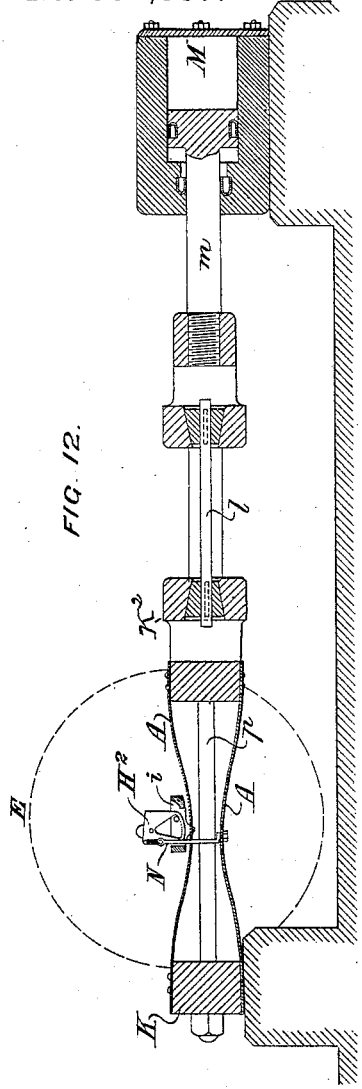
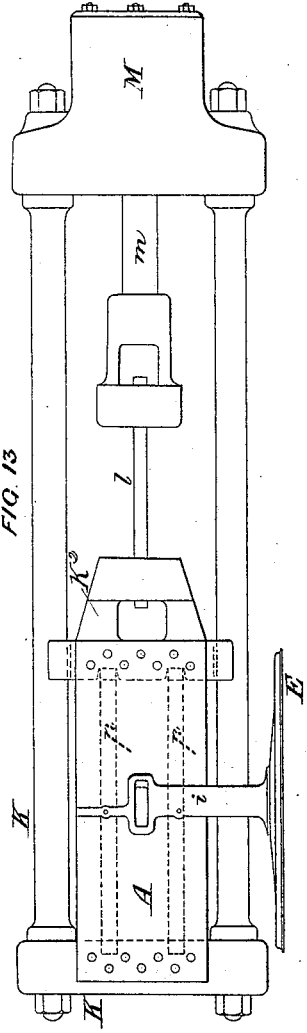
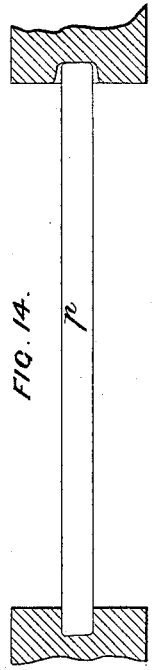

(No Model.) 7 Sheets—Sheet 7.

T. H. WARD.

APPARATUS FOR INDICATING WEIGHTS AND TESTING STRENGTH OF METALS.

No. 304,587. Patented Sept. 2, 1884.

Witnesses
John M. Clayton
James F. Tobin

Inventor
Thomas H. Ward
by his Attys.
Horton and his

UNITED STATES PATENT OFFICE.

THOMAS HENRY WARD, OF TIPTON, COUNTY OF STAFFORD, ENGLAND.

APPARATUS FOR INDICATING WEIGHTS AND TESTING STRENGTH OF METALS.

SPECIFICATION forming part of Letters Patent No. 304,587, dated September 2, 1884.

Application filed March 28, 1884. (No model.) Patented in England July 24, 1883, No. 3,635.

*To all whom it may concern:*

Be it known that I, THOMAS HENRY WARD, a subject of the Queen of Great Britain and Ireland, and residing at Tipton, in the county of Stafford, England, have invented certain improvements in machinery or apparatus for indicating weights and forces, applicable also to machines for testing the strength of metals, (for which I have obtained a patent in Great Britain, No. 3,635, dated July 24, 1883,) of which the following is a specification.

My invention relates to machinery or apparatus for indicating weights and forces, applicable also to machines for testing the strength of metals; and it consists of certain arrangements and combinations of spring-plates, or plates or rods, and a spring or springs or their equivalents, as hereinafter described, acting on the principle of the parallelogram of forces which is the principle utilized in the arrangements described in the specifications to my two former Letters Patent No. 269,752, dated December 26, 1882, and No. 270,864, dated January 16, 1883.

In order that my said invention may be fully understood, I shall now proceed particularly to describe the same, and for that purpose shall refer to the several figures on the annexed sheets of drawings, the same letters of reference indicating corresponding parts in all the figures.

Figure 3:
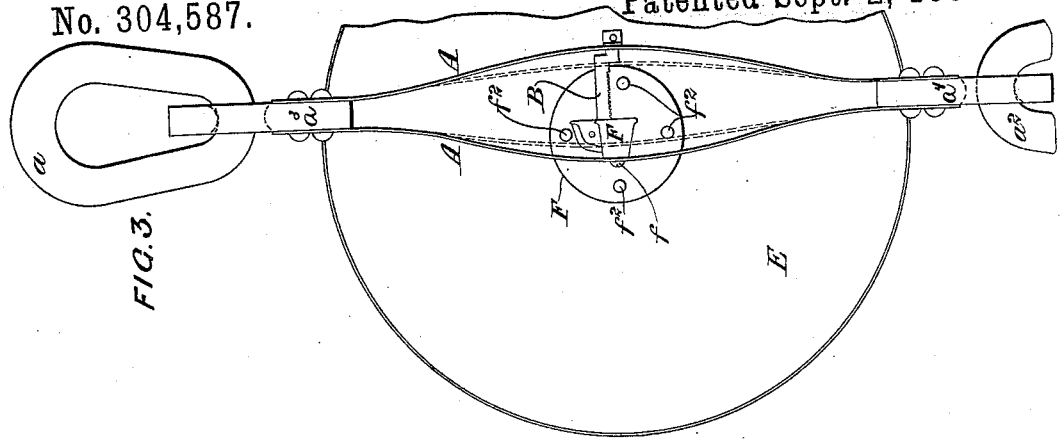
Figure 2:
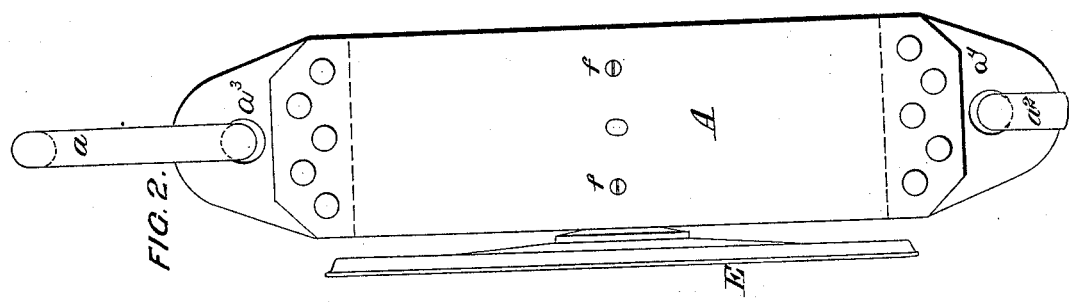
Figure 1:
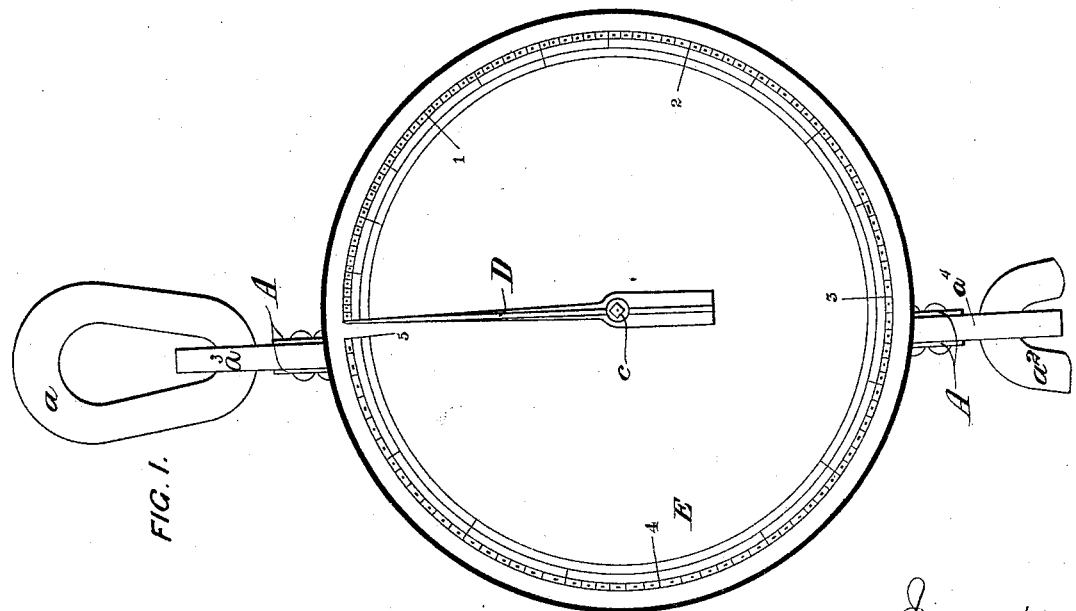

Figure 1 represents in front elevation, Fig. 2 in side elevation, and Fig. 3 in back elevation, an apparatus constructed according to one arrangement of my invention. Figs. 4 to 7 are details of the operating-gear, drawn to a larger scale, Fig. 4 being a side elevation with one of the plates removed; Fig. 5, a section on the line 1 2, Fig. 4; Fig. 6, a section on the line 3 4, Fig. 4; and Fig. 7, a section on the line 5 6, Fig. 4.

In carrying out my present invention, I employ two curved or bowed spring-plates, A, with their concaved sides facing each other, and with their extreme ends connected together in any suitable way—for example, as shown in the drawings. At one end of these combined spring-plates is provided a loop-shackle or the like, as at $a$, for suspending the apparatus to a crane or other support, while at the opposite end of the said combined plates is provided a loop-shackle or the like, as at $a^2$, for receiving the load to be weighed.

To one of the plates A is hinged or jointed a rack, B, gearing with a pinion, C, carried by the other plate A. When a load is placed on or attached to the loop $a^2$, or its equivalent, the plates A are thereby deflected more or less, and caused to approach nearer to each other, whereby the rack B imparts a greater or less movement of rotation to the pinion C, according to the amount of deflection imparted to the plates A by the load. The axis $c$, on which the pinion is fixed or formed, carries a pointer, D, (or pointers,) to indicate on a dial, E, (or dials,) also carried by the spring plate or plates the weight of the load attached to or carried by the lower end of the said plates A.

Any suitable means may be used for connecting the aforesaid gear to the plates A. In the drawings, I have shown a casting, F, for carrying the axis of the pinion, the said casting being secured to one of the plates A by the screws $f$, the dial E being secured to the said casting by the screws $f^2$.

$b$ is a roller for retaining the rack in position.

$b^2$ is a pinion for retaining the rack in gear with the pinion, and $b^3$ is an opening in the spring-plate for the passage of the rack.

Instead of arranging the plates A with their concave sides facing each other, as hereinbefore described, they may be arranged in the reverse position—that is to say, with their convex sides facing each other, as shown in Fig. 8—in which case the upper and lower ends of the said plates A are respectively connected to two rigid bars, (or equivalent connecting-pieces,) $a^3$ $a^4$, by one of which bars or connecting-pieces the apparatus is suspended, while the other bar or connecting-piece carries a hook shackle or receiver for the load to be weighed, which load causes the plates to deflect outwardly or move from each other, and, by means of a rack-and-pinion arrangement, operate a pointer to indicate on a dial the weight of the load. This rack-and-pinion arrangement will be like that hereinbefore described, with reference to Figs. 1 to 7, and I therefore have not considered it necessary to show it in Fig. 8.

According to another modification I employ two plates or sets of plates, A, (which may be spring-plates tempered flat or nearly flat,) connected at their upper and lower ends, respectively, to two rigid bars or connecting-pieces, as in the last-described arrangements. In combination with these plates, arranged as described, I employ a spring or springs, as at $g$, Fig. 9, for the purpose of avoiding too severe a strain due to a combination of leverage or deflection-strains and tensional strains at the same time and in the same plate. When the plates are unloaded, they are acted upon laterally by means of the said spring or springs $g$, so as to be normally deflected laterally, as a lever or levers; but when the load to be weighed is applied at the lower ends of the plates the amount of lateral deflection of the said plates is reduced more or less, according to the weight of the load.

The arrangement of rack-and-pinion gear, hereinbefore described, can be used with the plates and springs shown in Fig. 9; and therefore I do not consider it necessary to show the said gear in the said Fig. 9.

Instead of the straight rack, hereinbefore described, for imparting motion to the indicator-pointer, I may employ a toothed segmental or quadrantal lever or curved rack, as shown at H, Fig. 10, the said lever or rack being centered at $h$ to a casting, $i$, carried by one of the spring-plates A, and actuated by means of a rod or link, $j$, connected at one end to the segmental lever H, the said rod or link $j$ being connected at its opposite end to the other of the plates A in such a manner that when the plates A are deflected by the weight of the load the rod or link $j$ causes the segmental or quadrantal lever or curved rack H to turn on its fulcrum $h$ and impart motion to the pinion C, and thereby to the indicator-pointer, as hereinbefore described.

Figure 16:
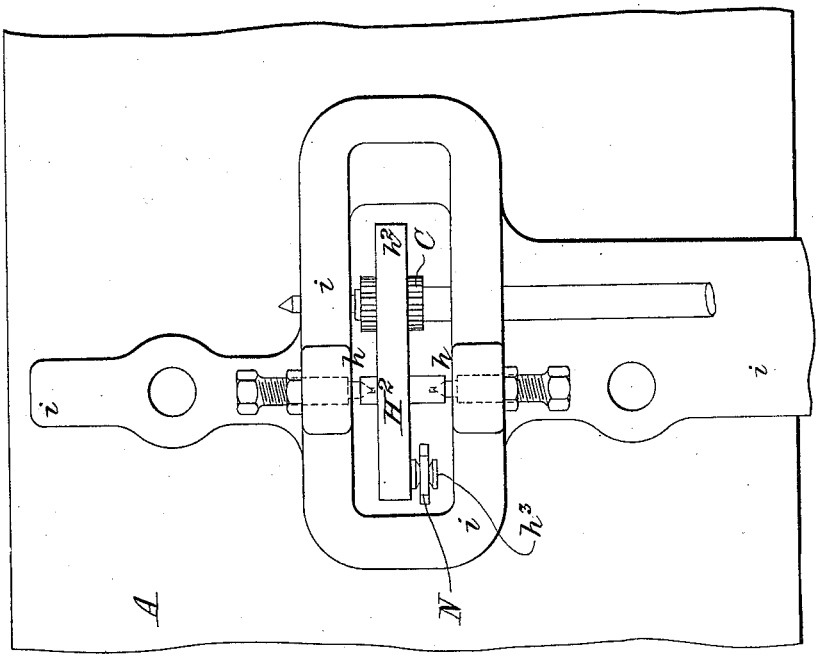
Figure 15:
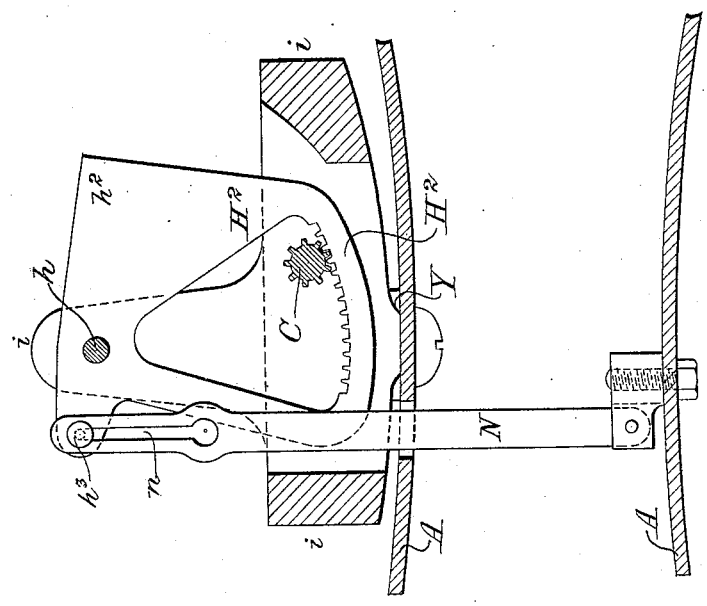

In applying my invention for the purpose of testing the strength of metals, I may employ the spring-plates or jointed plates or rods, as hereinbefore described, arranged in a vertical, horizontal, or any other convenient position. The following is a simple mode of employing them in a horizontal position, which I will describe with reference to Figs. 12 to 16, Fig. 12 being a vertical section, Fig. 13 a plan, Fig. 14 a detail, as hereinafter described, and Figs. 15 and 16, respectively, a vertical section and plan showing the rack-and-pinion gear for operating the pointer of the dial. One end of the combined spring-plates A is attached to a fixed part or casting of the frame K, the opposite end of the said combined plates being connected to a head-piece, $K^2$, capable of sliding between the rods of the frame K, and provided with means for connecting it to the bar of metal $l$ or other article to be tested, the opposite end of which bar or article is attached to the ram or piston-rod $m$ of the hydraulic cylinder M, (or to a screw, lever, or other apparatus which may be employed for applying the strain or testing force.) Upon applying the said strain or testing force the spring-plates A will be deflected, and, by actuating indicating mechanism analogous to that hereinbefore described with reference to the weighing apparatus, the amount of force exerted on the rod or article will be registered on the dial of the indicating apparatus.

The indicating mechanism which I prefer to employ is shown in the drawings, and consists of a toothed lever or quadrantal rack, $H^2$, counterweighted at $h^2$, and centered at $h$ to the casting $i$, carried by one of the plates A, the said casting also carrying the dial E and the bearings for the pinion C, the shaft of which carries the pointer. The other of the plates A carries a rod or link, N, which is connected to the lever $H^2$ by the pin $h^3$. In order to prevent the rebound of the spring-plates A from injuring the pointer-operating gear on the fracture of the article being tested, (if it be tested to destruction,) a slot, $n$, is formed in the link N, which travels over the pin $h^3$ when such fracture occurs, the counter-weight at $h^2$ bringing the rack to its normal position. To prevent the said plates from passing their normal position, owing to the rebound, the abutment-rods $p$ may be provided. One of these is shown in detail in Fig. 14.

It is obvious that various other arrangements of the spring-plates, or plates or rods and springs, may be employed in carrying my invention into effect, according to the strength required and other circumstances. For example, two or more pairs of spring-plates may be employed in one and the same machine, either for ascertaining weights or for testing the strength of metals, or for indicating forces generally.

Fig. 17 represents, in side elevation, an arrangement wherein two pairs of spring-plates are arranged side by side, they being connected to the same bars at top and bottom.

Fig. 11 shows an arrangement wherein a pair of springs with double blades or leaves is employed, the said blades or leaves being preferably separated by distance-pieces, as shown, to prevent sliding contact. These arrangements, it will be understood, are provided with rack or toothed sector and pinion-gear and pointers and dials, as hereinbefore described. I wish it to be understood that I do not limit myself to the number of spring-plates, or plates or rods and springs employed, as they may be varied as required. There may, if desired, also be more than one pointer and dial—say, for example, a pointer and dial at both back and front of the apparatus. I prefer to employ spring-plates of single leaves or layers, made thin and broad and riveted at their ends to the bars or connecting-pieces.

I am aware that compensating-springs have heretofore been used in weighing devices in connection with a rack and pinion and indicator, as in British Patent No. 4,358, of 1819; and I therefore do not claim this broadly; but

I claim as my invention—

1. The combination of spring-plates A A, and connecting-pieces at their ends, with a pinion, pointer, and dial carried by one of said plates, and a rack carried or moved by the other spring-plate, substantially as set forth.

2. The combination of spring-plates A A, connecting-pieces at their ends, and hooks or shackles, with a rack and pinion, dial, and pointer operated by the spring-plates, substantially as described.

In testimony whereof I have signed by name to this specification in the presence of two subscribing witnesses.

THOMAS HENRY WARD.

Witnesses:
WILSON KING,
*U. S. Consul, Birmingham.*
J. M. DICKINSON,
*U. S. Consulate, Birmingham.*